United States Patent [19]

Pickles

[11] 4,004,772
[45] Jan. 25, 1977

[54] MANUAL SEAT ADJUSTER

[75] Inventor: Joseph Pickles, Birmingham, Mich.

[73] Assignee: Ferro Manufacturing Corporation, Detroit, Mich.

[22] Filed: Jan. 30, 1975

[21] Appl. No.: 545,412

[52] U.S. Cl. ............................... 248/430; 308/3.8
[51] Int. Cl.² ........................................ F16M 13/00
[58] Field of Search .......... 248/298, 393, 394, 395, 248/420, 429, 430; 308/3.8, 6 R, 3.6

[56] References Cited

UNITED STATES PATENTS

| 1,537,067 | 5/1925 | Card .................... 308/6 R |
|---|---|---|
| 2,003,549 | 6/1935 | Miller .................. 308/3.8 |
| 2,014,553 | 9/1935 | Browne ................ 248/430 |
| 2,261,504 | 11/1941 | Saunders .............. 308/3.8 |
| 2,622,940 | 12/1952 | Johnson ............. 248/430 X |
| 2,667,912 | 2/1954 | McCormick ........... 248/430 |
| 2,679,889 | 6/1954 | Barden et al. ...... 308/6 R X |
| 2,721,750 | 10/1955 | Rudis et al. ......... 292/139 |
| 2,926,048 | 2/1960 | Gussack ............... 308/3.8 |
| 3,145,065 | 8/1964 | Cator ................. 308/6 R |
| 3,205,025 | 9/1965 | Jordan ................. 308/3.8 |
| 3,279,737 | 10/1966 | Krause ................ 248/430 |
| 3,353,874 | 11/1967 | Del Vecchio et al. .... 308/3.8 |
| 3,450,425 | 6/1969 | Leonhardt .......... 248/430 X |
| 3,545,824 | 12/1970 | Del Vecchio ........ 308/3.8 |
| 3,685,872 | 8/1972 | Babbs ............. 248/430 X |
| 3,712,690 | 1/1973 | Fall .................... 308/3.8 |

FOREIGN PATENTS OR APPLICATIONS

| 244,137 | 3/1963 | Australia ............. 248/430 |
|---|---|---|
| 1,349,006 | 12/1963 | France ............... 248/430 |
| 412,712 | 2/1946 | Italy ................... 308/6 R |
| 773,122 | 4/1957 | United Kingdom ...... 308/3.8 |
| 648,183 | 1/1951 | United Kingdom ...... 248/429 |
| 942,976 | 11/1963 | United Kingdom ...... 248/429 |

*Primary Examiner*—Lawrence J. Staab
*Attorney, Agent, or Firm*—Whittemore, Hulbert & Belknap

[57] ABSTRACT

A manually adjustable vehicle seat comprises elongated seat supporting carriages each of which is mounted for rolling movement on a pair of balls located adjacent the ends of the carriage. The balls roll on short track members having end abutments and the track members include means for limiting longitudinal movement. A latch lever is provided having an aperture plate portion movable in latching position to receive one of a series of latching projections provided on the mounting base.

11 Claims, 10 Drawing Figures

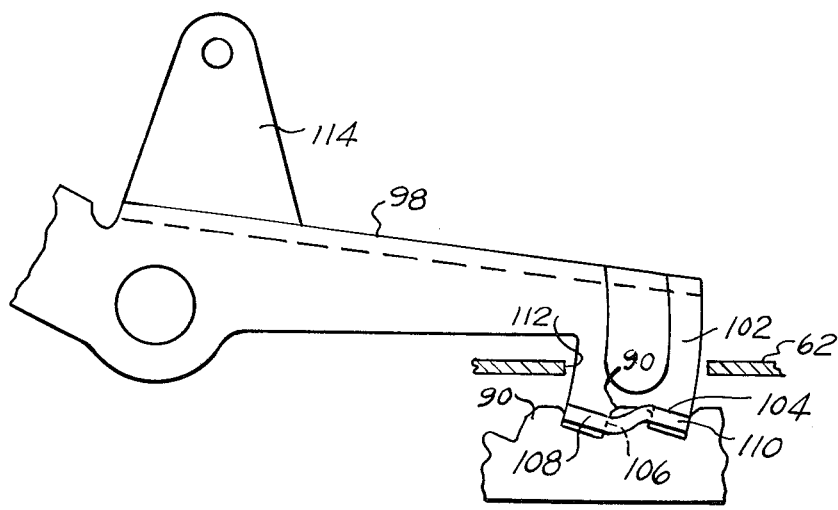
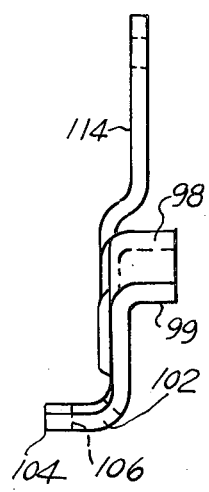
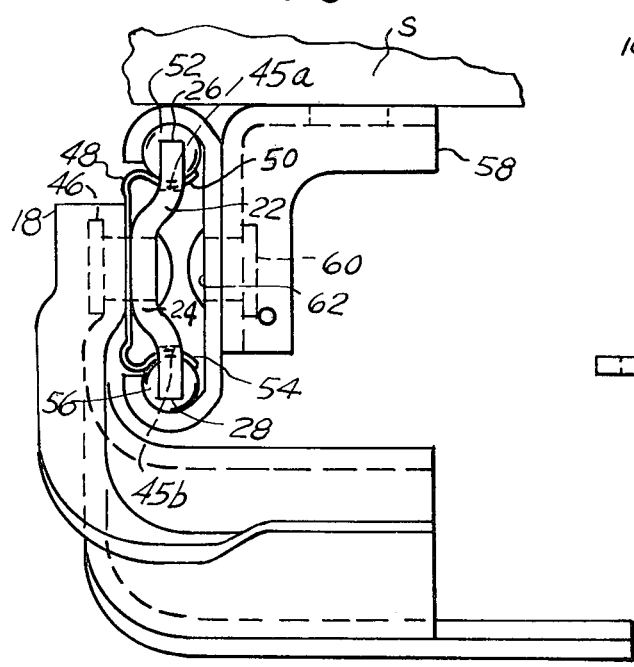
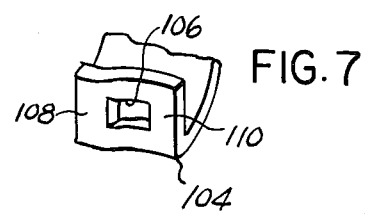
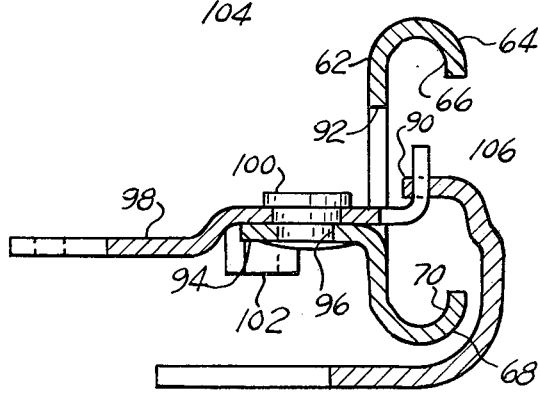

MANUAL SEAT ADJUSTER

BRIEF SUMMARY OF THE INVENTION

The seat construction of the present invention comprises a pair of assemblies mounted at opposite ends of the seat. Each assembly comprises structure providing a pair of short suporting track elements each of which has abutment means at opposite ends. At each end of the seat there is provided an elongated seat supporting bar herein referred to as a carriage. The carriage is of generally C-shaped cross-section having upper and lower reversely curved flanges adapted to be engageable with balls located at the upper and lower sides of the track element. After the carriage has been assembled with the track elements and with the balls in place, the carriage is deformed so as to prevent escape of the balls.

A special latching construction is provided comprising a longitudinally extending series of laterally projecting locating teeth provided on a stationary mounting base. Pivoted to the carriage is a latching lever having at one end a plate portion provided with an aperture shaped to receive one of the locating teeth.

BRIEF DESCRIPTION OF THE DRAWINGS

FIG. 3 is an enlarged end view of the structure shown in FIG. 1.

FIG. 4 is a sectional view on the line 4—4, FIG. 1.

FIG. 5 is a fragmentary plan view illustrating the coaction between the latching lever and the locating teeth.

FIG. 6 is an end view of the lever illustrated in FIG. 5, as seen from the right thereof.

FIG. 7 is a fragmentary elevational view of the end of the latching lever.

DETAILED DESCRIPTION

Figure 2:
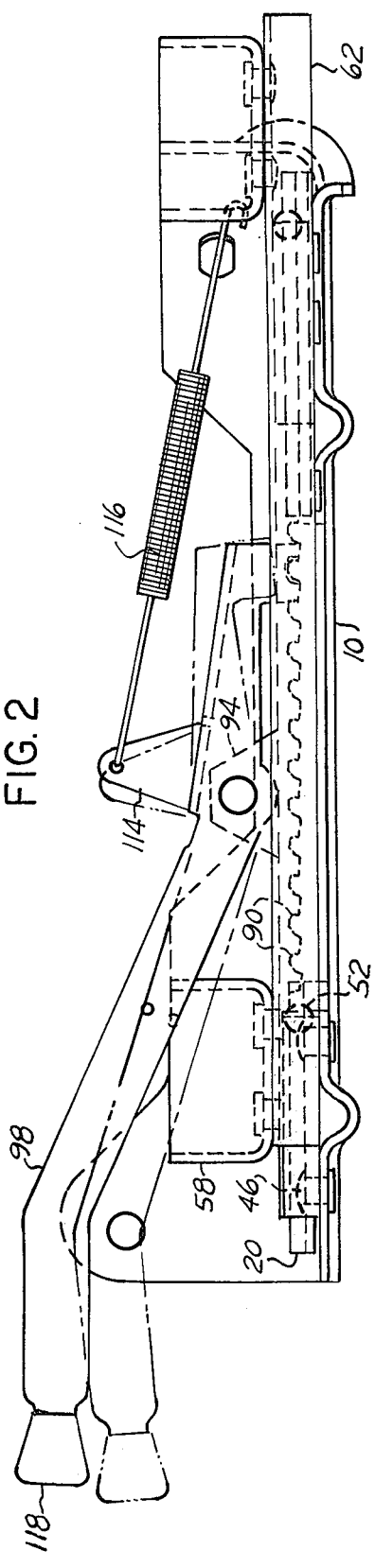
FIG. 2 is a plan view of the assembly illustrated in FIG. 1.
Figure 1:
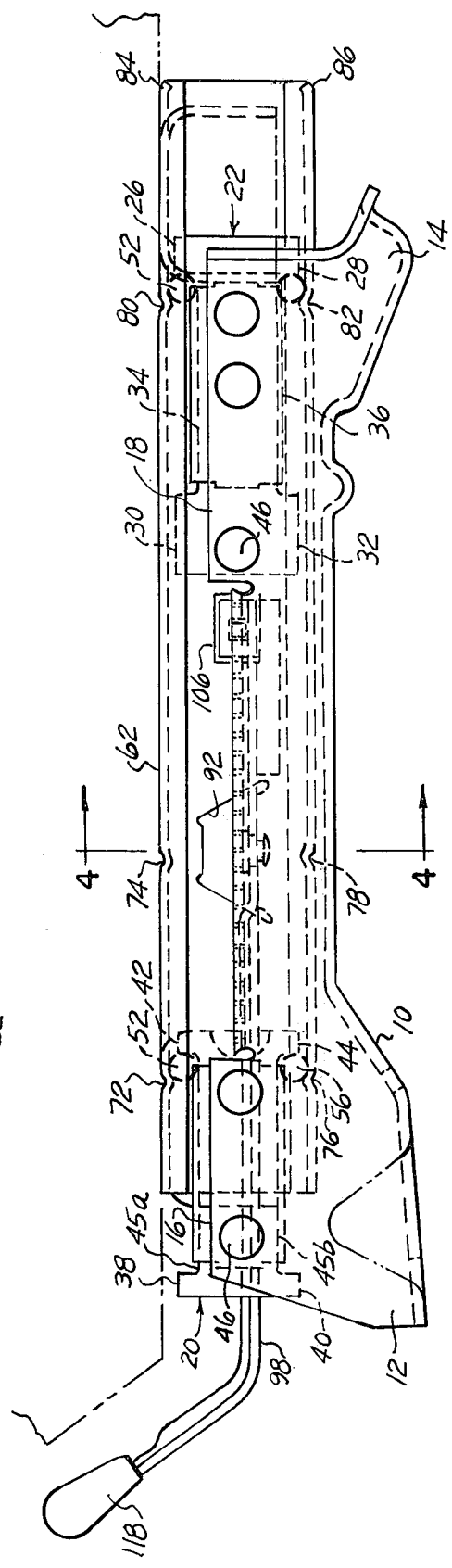
FIG. 1 is a side elevational view of the assembly at one end of the seat.

Referring now to the drawings, the seat supporting construction at the end of the seat provided wih the latching means, is illustrated in its entirety in FIGS. 1 and 2. It will be understood that the construction at the opposite end of the seat is essentially the same except for reversal of direction and except for the fact that locating teeth are omitted.

The supporting construction comprises a mounting base 10 having a front downwardly extending portion 12 and a rear downwardly extending portion 14 adapted to be bolted or otherwise secured to the floor of the passenger compartment of a vehicle. The intermediate portion of the mounting base is elevated as clearly illustrated in FIG. 1. The mounting base includes a front upwardly extending portion 16 and a rearwardly upwardly extending portion 18 to which are secured a front track forming element 20 and a rear track forming element 22.

The track forming elements are elongated strips which have a cross-sectional shape as best illustrated in FIG. 3 where the rear track forming element 22 is seen to have an intermediate web portion 24, and upwardly and downwardly extending abutment ears 26 and 28 located at the rear thereof, and upwardly and downwardly extending ears 30 and 32 located at the forward end thereof. Intermediate the ears 26 and 30 there is provided a flat horizontally extending trackway 34 provided by the upper edge of the strip, and similarly, between the downwardly extending ears 28 and 32 is a downwardly extending trackway 36.

The front track forming elements 20 are similar and have front upwardly and downwardly extending abutments 38 and 40, and rear upwardly and downwardly extending abutments 42 and 44. Intermediate the ears of abutments 38 and 42 the upper edge of the strip provides a straight flat ball supporting surface or trackway 45a and intermediate the ears or abutments 40 and 44 at the bottom edge of the track forming element 20 is a straight flat ball engaging surface 45b. The track forming elements are rigidly attached to the adjacent upwardly extending portion 16 or 18 of the mounting base by suitable means such as rivets 46.

Also attached to the upwardly extending portions of the base are resilient ball retainers 48 each having an upper laterally extending flange 50 which is transversely curved to substantially embrace an upper seat supporting ball 52, and a similar laterally curved longitudinally extending downwardly concave flange 54 shaped to interfit with the lower supporting ball 56.

The longitudinally adjustable vehicle seat, a portion of which is indicated at S, is suitably secured to front and rear mounting brackets 58, the brackets being rigidly secured as by rivets 60 to the front and rear end portions of the longitudinally extending carriage 62.

As best illustrated in FIG. 4, each of the carriages is of generally C-shape in cross-section having an upper flange 64 which is laterally and transversely curved to provide a generally arcuate recess 66 shaped to have rolling engagement with the upper seat supporting ball 52. The lower edge of the carriage 62 has a laterally and transversely curved edge portion 68 defining an upwardly concave recess 70 which receives the lower seat supporting or retaining ball 56.

From an inspection of FIG. 3 it will be observed that the laterally extending portions 50 and 54 of the ball retainer 48 lie along the straight generally hoizontal ball supporting portions 45a and similarly, the lower portion 54 of the ball retainer lies along the straight track forming portion 45b. The ball retainer is formed of resilient hardened steel material and constitutes a wear surface for the balls so that continued adjustment of the seat does not result in wear of the track forming elements. Similarly, the ball retainer elements serve to insure that the balls are firmly engaged at all times with the inner concave ball engaging surface of the carriage 62. It will be appreciated that in use the weight of the seat and occupants thereof urge the carriage 62 downwardly so that the upper ball 52 is firmly engaged within the concave surface 66 of the carriage. However, the downward urging of the seat might, in the absence of the resilient ball retainer, provide for disengagement between the lower seat supporting ball 56 and the upwardly concave surface 70 at the lower edge of the carriage. Forward and rearward adjustment of the seat results in the carriage rolling on the balls 62 while the balls 52 at the same time roll on the concave trackway provided by the upper flange 50 of the ball retainer.

It is desirable for the upper and lower balls 52 and 56 to partake of precisely the same movement. It will be understood that the lower ball insures against lifting of the seat as a result of bumps or other vehicle motion and that the resilient ball retainer will insure that the upper and lower balls are constantly in the same position relative to the seat supporting elements.

In assembling the construction the balls are inserted into the space provided by the associated laterally curved flanges of the carriages, such as the carriage 62, and the reversely curved edge portions of the ball retainers. After the balls have been inserted the carriage is deformed by providing abutment forming dimples 72, 74, 76 and 78 at the front thereof. Similarly, dimples 80 and 82 are provided adjacent the rear of the carriage while the extreme rear end of the carriage is deformed, as indicated at 84 and 86, to provide ball retaining abutments.

With the foregoing construction each seat is mounted for substantially free rolling movement on four balls, two being provided at each end of the seat and of these two, one is located adjacent the forward edge of the seat and the other is located adjacent the rearward edge of the seat.

In order to provide for secure latching of the seat in adjusted position, the mounting base at one side of the seat is bent laterally as seen in FIGS. 1 and 4 and provided with a multiplicity of teeth 90 and these teeth extend laterally inwardly of the seat construction into close proximity to vertical web of carriage 62. The adjacent carriage 62 has an intermediate portion partially cut out to provide an opening 92 as seen in FIGS. 1 and 4 and this cutout portion is bent laterally to extend inwardly and to provide a pivot supporting ear 94. This ear is provided with an opening 96 to which a latching lever 98 having a stiffening flange 99 is pivoted as by the rivet indicated at 100.

The lever 98 has a laterally extending end portion 102 which at its outer end is bent upwardly to provide an ear 104 which is apertured as indicated at 106. The aperture 106 has portions 108 and 110 at opposite sides thereof which are adapted to enter into spaces between the mounting teeth 90, as best seen in FIG. 5, and these portions 106 and 108 are interconnected across the top of the opening 106 as clearly seen in FIG. 6.

The laterally extending portion 102 of the latching arm or lever 98 extends through an opening 112 provided in the vertically extending wall of the carriage 62, as best seen in FIG. 5. This provides close support for the apertured ear 104 of the latching lever closely adjacent to the point where the opening therein surrounds and closely engages opposite sides of one of the locating teeth while at the same time the sides of the ear 104 engage the confronting surfaces of the teeth adjacent the tooth which enters the opening 106.

The latching lever 98 is provided with a laterally extending ear 114 to which is anchored a tension spring 116 biasing the lever 98 to the latching position. Forwardly of the seat the lever 98 has a handle portion 118 which when moved to the left (downwardly as seen in FIG. 2) will swing the lever to release the latching ear 104 from the associated tooth 90 of the mounting base.

FIG. 7 illustrates the end of the latching lever as seen in FIGS. 5 and 6.

Figure 8:
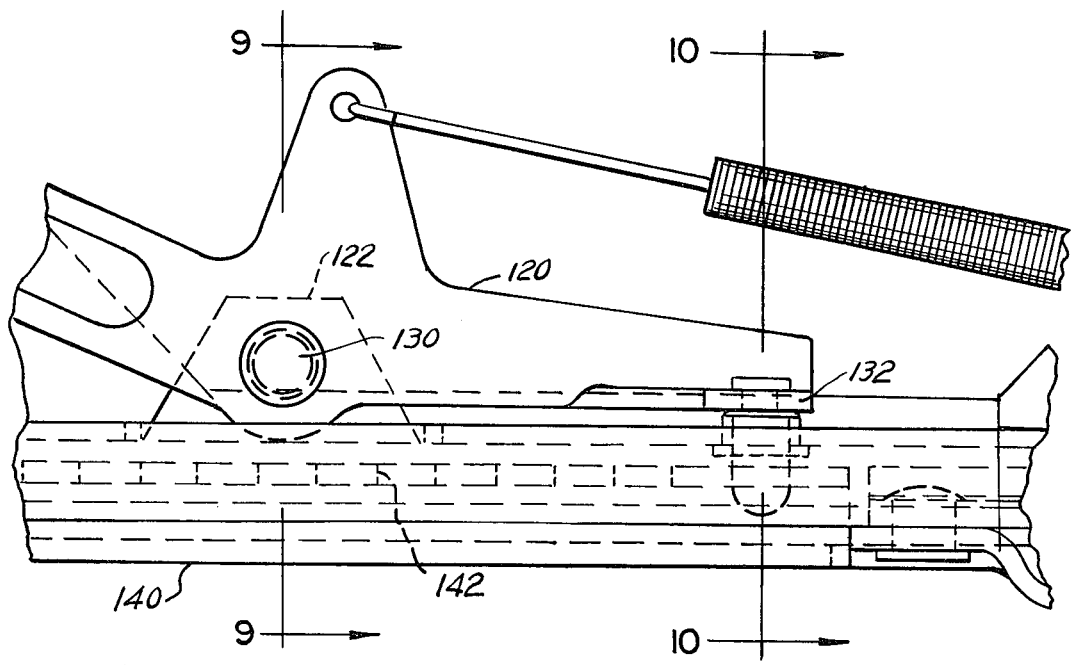
FIG. 8 is a fragmentary plan view of a modification of latching means.
Figure 9:
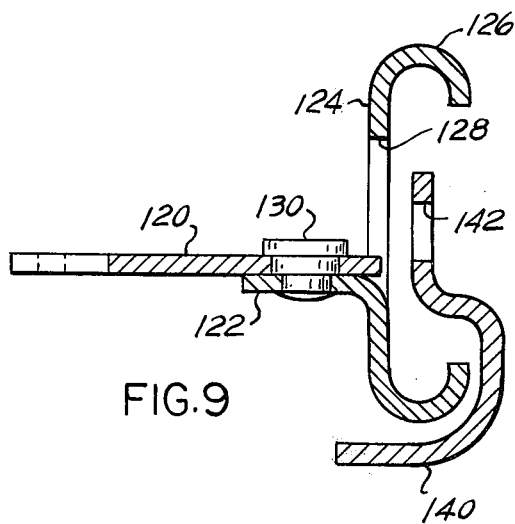
FIGS. 9 and 10 are sectional views on the line 9—9, and 10—10, of FIG. 8.
Figure 10:
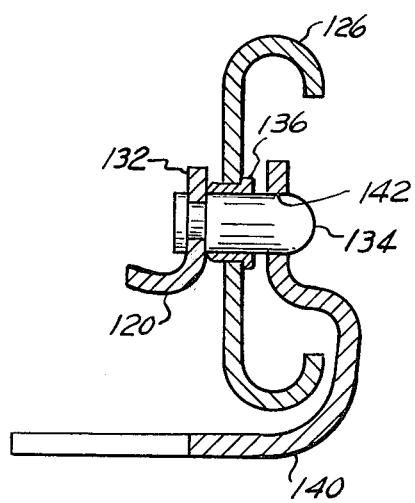

Referring now to FIGS. 8–10 there is illustrated a modified form of latching construction which embodies the advantages of the previously described embodiment. As seen in these Figures, the latching lever is indicated at 120 and is pivoted to an ear 122 struck out of the intermediate web 124 of carriage 126, leaving an opening 128 therein. The lever 120 is pivoted by suitable pivot means 130 such as a rivet to the ear 122 and at its free end the lever 120 has an upwardly bent plate portion 132 to which is fixedly secured a pin 134. The carriage 126 has an opening therethrough which receives a guide bushing 136 in which the pin 134 is longitudinally slidable. The base 140 is provided with a multiplicity of pin receiving openings 142. With this arrangement, as best seen in FIG. 10, the latching pin 134 is guidably received in the bushing 136 mounted in an opening in the carriage and the end of the bushing 136 is located closely adjacent to the portion of the base 140 provided with the series of openings 142.

What I claim as my invention is:

1. Support structure for a vehicle seat comprising generally horizontally extending front and rear rail portions, each formed of horizontally elongated strip material having its width disposed generally vertically and having a generally horizontal upper edge forming a trackway, a single ball on each portion, an elongated carriage movable longitudinally of said rail portions, said carriage being formed of horizontally elongated strip material with its width disposed generally vertically and having a laterally and downwardly exending top edge portion, defining a downwardly open channel in which said balls are movable as said carriage is moved, pairs of abutments on the top edges of said rail portions and on said carriage engageable with said balls to limit the horizontal movement of said carriage, the top edge portion of said carriage being laterally and reversely arcuately curved to provide for support of said carriage on said balls by contact between said balls and the bottom of said channel, the lower edge of said carriage being laterally and reversely arcuately curved at the said one side of said carriage to provide a ball receiving channel below said rail portions, said rail portions having generally horizontal bottom edges forming trackways, balls interposed between the lower edges of said rail portions and the channel therebelow, and resilient ball retainers formed of spring steel fixed to said rail portions to extend for the full length of the edge portions thereof forming the trackways, and including laterally extending free flanges interposed between the tops and bottoms of said rail portions and said balls to maintain said balls in contact with the bottoms of said channels at all times.

2. Support structure as defined in claim 1 in which said rail portions are located to extend along the space between the channel-forming edges of said carriage.

3. Support structure as defined in claim 2 in which the strips constituting said rail portions have longitudinally extending laterally offset central portions.

4. Support structure for a vehicle seat comprising a fixed base formed of sheet metal and having a horizontal portion for connection to the floor of a vehicle and an upwardly extending portion, separate longitudinally aligned support rails fixed to the upwardly extending portion of said base at opposite ends thereof, each of said rails being in the form of an elongated strip with its width dimension extending vertically and its upper and lower edges disposed horizontally and constituting trackways, said rails having a laterally offset longitudinally extending portion intermediate the edges thereof to which the upwardly extending portion of said base is directly attached, a carraige formed of elongated strip material having its long dimension extending horizontally and its width dimension extending vertically and its upper and lower edge portions extending laterally from the same side thereof and then toward each other to define elongated, horizontally confronting channels lying directly above and below the edges of said rails, rollers between the edges of said rails and the adjacent channels, a longitudinally extending locating portion of the upwardly extending portion of said base being shaped to extend into the space between said channels intermediate said rails and provided with a series of pairs of spaced abutment surfaces closely adjacent to the side of said carriage, a movable latch lever mounted on the opposite side of said carriage, said carriage having a restricted opening the opposite sides of which constitute abutment surfaces, and latch means including a first part movable through said restricted opening and a second part movable into and out of engagement between a selected pair of said abutment surfaces to serve as a key operating between a pair of abutment surfaces on said carriage and a selected pair of abutment surfaces on the locating portion of said base in close proximity to the pair of abutment surfaces on said carriage.

5. Support structure for a vehicle seat comprising a fixed base formed of sheet metal and having a horizontal portion for connection to the floor of a vehicle and an upwardly extending portion, separate longitudinally aligned support rails fixed to the upwardly extending portion of said base at opposite ends thereof, each of said rails being in the form of an elongated strip with its width dimension extending vertically and its upper and lower edges disposed horizontally and constituting trackways, a carriage formed of elongated strip material having its long dimension extending horizontally and its width dimension extending vertically and its upper and lower edge portions extending laterally from the same side thereof and then toward each other to define elongated, horizontally confronting channels lying directly above and below the edges of said rails, rollers between the edges of said rails and the adjacent channels, a longitudinally extending locating portion of the upwardly extending portion of said base being shaped to extend into the space between said channels intermediate said rails and provided with a series of pairs of spaced abutment surfaces closely adjacent to the side of said carriage, a movable latch lever mounted on the opposite side of said carriage, said carriage having a restricted opening the opposite sides of which constitute abutment surfaces, and latch means including a first part movable through said restricted opening and a second part movable into and out of engagement between a selected pair of said abutment surfaces to serve as a key operating between a pair of abutment surfaces on said carriage and a selected pair of abutment surfaces on the locating portion of said base in close proximity to the pair of abutment surfaces on said carriage, in which the pairs of abutment surfaces of said locating portion are provided by a series of openings, and in which the first and second parts of said latch means comprise a pin slidably received in an opening provided in the portion of said carriage intermediate said channels.

6. Support structure for a vehicle seat comprising an elongated generally horizontally extending support rail, said rail being in the form of a generally flat elongated strip having its length dimension disposed generally horizontally and its width dimension disposed vertically, the upper and lower edges of said rail being parallel and constituting upper and lower trackways, a carriage formed of elongated strip material having its length dimension generally horizontal and its width dimension vertical and its upper and lower edge portions extending laterally from the same side thereof and then toward each other to define parallel confronting channels, said carriage being positioned to receive said rail in the space between said channels with said channels located directly above and below said trackways, an elongated roller retainer fixed to said rail and having elongated resilient upper and lower parallel arms, said upper arm being located above said upper trackway and said lower arm being disposed below said lower trackway, said arms being formed of wear-resistant resilient material and constituting wear plates for said trackways, said arms being resiliently biased away from the adjacent trackways, a roller in each channel, each of said roller retainer arms being effective to bias the roller engaged thereby into engagement with the adjacent channel but being yieldable upon vertical loading of said carriage to yield to provided for engagement with the adjacent trackway to provide a rolling bearing rolling longitudinally of both said rail and said carriage and to have rolling contact with the adjacent arm of said roller retainer as said roller retainer is engaged on the adjacent trackway.

7. Structure as defined in claim 6 in which said roller is a ball and said channels are arcuately concave in transverse cross-section.

8. Structure as defined in claim 6 in which support means supports a pair of rails in longitudinally aligned spaced relationship and said carriage is elongated to receive both of said rails intermediate the channels formed thereon.

9. Structure as defined in claim 8 in which said roller is a ball, a single ball is provided above and below each rail, and said channels are arcuately concave in transverse cross-section.

10. Structure as defined in claim 7 in which the upper arm of said resilient roller retainer is upwardly longitudinally concave to engage the upper ball and the lower arm of said retainer is downwardly longitudinally concave to engage the lower ball.

11. Structure as defined in claim 6 in which said rails are provided with vertically extending abutments at the end of each trackway adapted to engage the roller associated therewith.

* * * * *